US009781001B2

United States Patent
Ashwood-Smith

(10) Patent No.: US 9,781,001 B2
(45) Date of Patent: Oct. 3, 2017

(54) TRANSPORT NETWORK TUNNEL SETUP BASED UPON CONTROL PROTOCOL SNOOPING

(71) Applicant: Peter Ashwood-Smith, Gatineau (CA)

(72) Inventor: Peter Ashwood-Smith, Gatineau (CA)

(73) Assignee: Huawei Technologies Co., Ltd., Shenzhen (CN)

(*) Notice: Subject to any disclaimer, the term of this patent is extended or adjusted under 35 U.S.C. 154(b) by 221 days.

(21) Appl. No.: 14/820,000

(22) Filed: Aug. 6, 2015

(65) Prior Publication Data
US 2017/0041190 A1   Feb. 9, 2017

(51) Int. Cl.
| | |
|---|---|
| H04L 12/803 | (2013.01) |
| H04L 12/863 | (2013.01) |
| H04L 29/08 | (2006.01) |
| H04L 12/24 | (2006.01) |
| H04L 12/911 | (2013.01) |

(52) U.S. Cl.
CPC ........ H04L 41/0813 (2013.01); H04L 47/125 (2013.01); H04L 47/825 (2013.01); H04L 69/326 (2013.01)

(58) Field of Classification Search
CPC ....... Y02B 60/33; H04L 45/245; H04L 47/41; H04L 47/825; H04L 69/326
See application file for complete search history.

(56) References Cited

U.S. PATENT DOCUMENTS

| | | | |
|---|---|---|---|
| 7,869,432 B1 * | 1/2011 | Mollyn | H04L 12/4625 370/221 |
| 2009/0003313 A1 | 1/2009 | Busch et al. | |
| 2014/0025736 A1 * | 1/2014 | Wang | H04L 45/46 709/204 |
| 2015/0023368 A1 | 1/2015 | Connolly et al. | |

FOREIGN PATENT DOCUMENTS

| | | |
|---|---|---|
| CN | 101335646 | 12/2008 |
| CN | 103001847 | 3/2013 |

OTHER PUBLICATIONS

International search report and written opinion; PCT/CN2016/080377; dated Jul. 27, 2016.
Mick Seaman, "Link Aggregation Control Protocol", Rev. 4.0, Saturday, Mar. 7, 1999, pp. 1 to 39.

* cited by examiner

*Primary Examiner* — Phirin Sam
*Assistant Examiner* — Debebe Asefa

(57) ABSTRACT

Rather than there being a requirement that specific instructions be issued to cause a transport network tunnel to be configured, it is proposed herein to have a transport node autonomously determine that a transport network tunnel is to be configured and, responsively, cause the transport network tunnel to be configured. In general, a transport node (an L0/L1 device) adjacent to the packet device at the origin of LACP messages snoops on the LACP messages. The transport node may determine, based on the contents of a control LACP message, that a new packet network link is to be (Continued)

established between the origin packet device and a destination packet device. Responsive to the determining, the transport node adjacent to the origin packet device causes a transport network tunnel to be established between one of its ports and a port at a transport node adjacent the destination packet device.

15 Claims, 6 Drawing Sheets

TRANSPORT NETWORK TUNNEL SETUP BASED UPON CONTROL PROTOCOL SNOOPING

FIELD

The present application relates, generally, to transport network tunnel setup and, more specifically, to transport network tunnel setup based upon control protocol snooping.

BACKGROUND

Transport software defined networking (SDN) may be considered to apply to application of SDN techniques to the transport layers of a service provider Wide Area Network (WAN). The transport layers include layer 0 and layer 1. In the seven-layer Open Systems Interconnection (OSI) model of computer networking, the physical layer is layer 1. The network cabling is sometimes referred to as "layer 0." Layer 0 may use, for example, Dense Wavelength Division Multiplexing (DWDM) or photonics. Layer 1 may, for example, employ protocols such as Synchronous Optical Networking (SONET), Synchronous Digital Hierarchy (SDH) and Optical Transport Network (OTN).

SUMMARY

Rather than there being a requirement that specific instructions be issued to cause a transport network tunnel to be configured, it is proposed herein to have a transport node autonomously determine that a transport network tunnel is to be configured and, responsively, cause the transport network tunnel to be configured. In general, a transport node (an L0/L1 device) adjacent to the packet device at the origin of LACP messages snoops on the LACP messages. for example, the transport node may determine, based on the contents of a control LACP message, that a new packet network link is to be established between the origin packet device and a destination packet device. Responsive to the determining, the transport node adjacent to the origin packet device causes a transport network tunnel to be established between one of its ports and a port at a transport node adjacent the destination packet device.

According to an aspect of the present disclosure, there is provided a method of operating a first transport network node. The method includes receiving, on a first port connecting the first transport network node to a first packet forwarding device, a Link Aggregation Control Protocol (LACP) control message, determining, by snooping the LACP control message, that the LACP control message relates to a packet network link between the first packet forwarding device and a second packet forwarding device, the second packet forwarding device being connected to a second port of a second transport network node and, responsive to the determining, causing configuration of a transport network tunnel from the first port at the first transport network node to the second port at the second transport network node. In other aspects of the present application, there is provided a network comprising a transport network node for carrying out this method and a computer readable medium is provided for adapting a processor in a transport network node to carry out this method.

According to another aspect of the present disclosure, there is provided a method of operating a first transport network node. The method includes determining that a time since a Link Aggregation Control Protocol control message has been received for passage on a given transport network tunnel has exceeded a threshold and, responsive to the determining, causing the given transport network tunnel to be removed. In other aspects of the present application, a transport network node is provided for carrying out this method and a computer readable medium is provided for adapting a processor in a transport network node to carry out this method.

Other aspects and features of the present disclosure will become apparent to those of ordinary skill in the art upon review of the following description of specific implementations of the disclosure in conjunction with the accompanying figures.

BRIEF DESCRIPTION OF THE DRAWINGS

Reference will now be made, by way of example, to the accompanying drawings which show example implementations; and in which.

DETAILED DESCRIPTION

Figure 1:
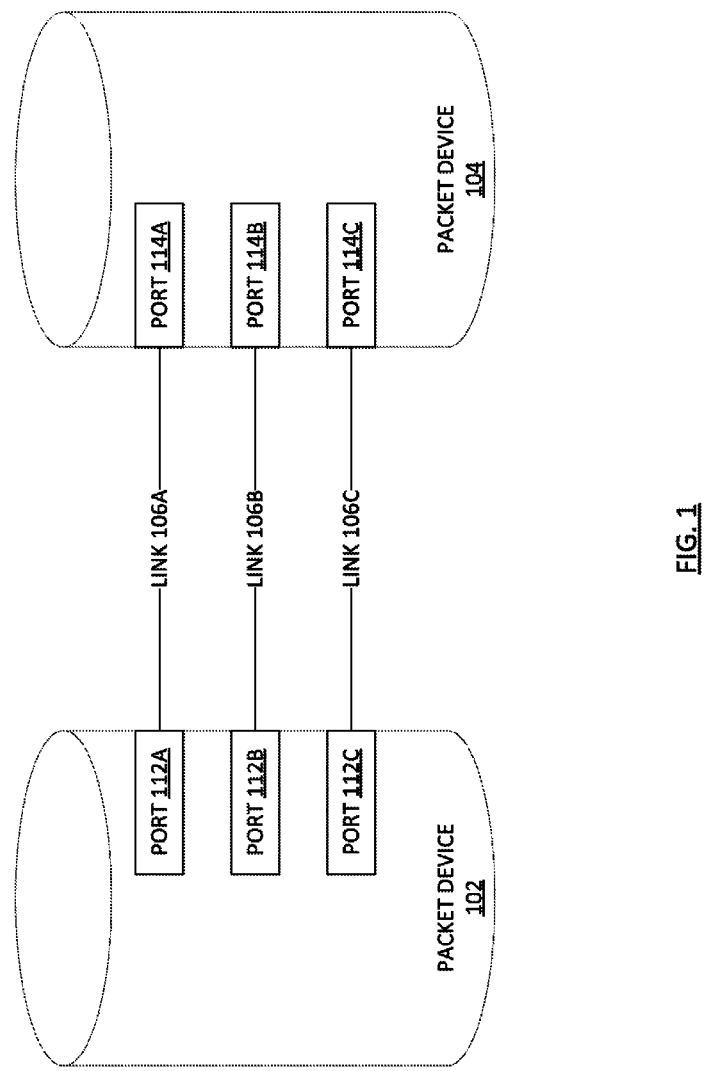
FIG. 1 illustrates two packet devices connected by multiple packet network links.

FIG. 1 illustrates a first packet device 102. "Packet device," in this context, refers to the first packet device 102 employing layer 2 or layer 3 networking protocols.

In the seven-layer OSI model of computer networking, the data link layer is layer 2. The data link layer is the protocol layer that transfers data between adjacent network nodes in a wide area network or between nodes on the same local area network segment. The data link layer provides the functional and procedural means to transfer data between network entities and might provide the means to detect and possibly correct errors that may occur in the physical layer.

Examples of data link protocols are Ethernet for local area networks (multi-node), the Point-to-Point Protocol (PPP), High-Level Data Link Control (HDLC) and Advanced Data Communication Control Procedures (ADCCP) for point-to-point (dual-node) connections.

In the seven-layer OSI model of computer networking, the network layer is layer 3. The network layer is responsible for packet forwarding including routing through intermediate routers.

The first packet device 102 is illustrated in FIG. 1 as being connected to a second packet device 104 by three packet network links: a first packet network link 106A; a second packet network link 106B; and a third packet network link 106C (referenced individually or collectively as 106).

Packet network links are often characterized by their capacity for carrying data and by the protocol used. In the example of FIG. 1, each of the three packet network links 106 may be considered to carry, say, Ethernet frames at a rate of 10 gigabits per second (10,000,000,000 bits per second).

The first packet device 102 includes a distinct port 112 associated with each of the distinct packet network links

106. More specifically, the first packet device 102 includes a first port 112A associated with the first packet network link 106A, a second port 112B associated with the second packet network link 106B and a third port 112C associated with the third packet network link 106C.

Similarly, the second packet device 104 includes a distinct port associated with each of the distinct packet network links 106. More specifically, the second packet device 104 includes a first port 114A associated with the first packet network link 106A, a second port 114B associated with the second packet network link 106B and a third port 114C associated with the third packet network link 106C.

Just as packet network links are often characterized by their capacity, the ports 112, 114 that connect to the packet network links 106 may also be characterized by their capacity. For example, at the first packet device 102, the first port 112A connected to the first packet network link 106A may be considered to be a 10 gigabit port.

Link Aggregation ("LAG") allows the multiple parallel packet network links 106 between the first packet device 102 and the second packet device 104 to be treated as a single packet network link, with a higher capacity than any of the individual packet network links. A consequence of LAG is that the individual ports may also be considered to have been aggregated. That is, after the three packet network links 106 have been aggregated, it may be considered that there is a single, 30 gigabit port at the first packet device 102, connected to a single, 30 gigabit, aggregate packet network link to the second packet device 104.

It is desirable to balance the traffic that is carried on each packet network link of an aggregate packet network link. However, network administrators often wish to avoid reordering Ethernet frames. An attempt to meet these goals may be implemented by sending all packets associated with a particular session across the same packet network link 106. To determine which packet network link to use to send a given packet, the header (or a part of the header) may be subjected to a hashing algorithm. Those packets for which the hashing algorithm yields the same hash may be sent on a particular one of the packet network links 106. Alternatively, a round robin approach may be used, where in each new packet to be sent may be sent on the next packet network link 106 in a circular fashion. In a further approach, a new packet to be sent may be sent on a given packet network link 106 responsive to the given packet network link 106 being determined to be the least congested packet network link 106.

Individual packet network links 106 in a LAG aggregated packet network link may be termed "LAG members." In general, it may be shown that LAG members 106 can be added to, and removed from, a LAG aggregated packet network link with almost no detrimental effects to traffic flowing, as long as sufficient capacity remains.

To facilitate the management of the ports at each of the packet devices 102, 104, each of the packet devices 102, 104 may, optionally, employ a protocol called the Link Aggregation Control Protocol ("LACP").

LACP, in operation, relies upon the transmission, by a packet device at the origin end of a packet network link, of messages, or Protocol Data Units (LACPDUs), over all packet network links that have LACP enabled. LACPDUs generally arrive at a packet device on a destination end of a packet network link. In those situations wherein the packet device on the destination end of the packet network link also has LACP enabled, it is expected that the packet device on the destination end of the packet network link will also transmit LACPDUs along a reciprocal packet network link.

Through this exchange of unsolicited messages, the packet device at the origin end of multiple packet network links and the packet device at the destination end of the multiple packet network links may be enabled to detect that there exist multiple packet network links between themselves. The packet devices may then aggregate the multiple packet network links into a single logical packet network link.

Notably, the packet devices 102, 104 of FIG. 1 may communicate over the schematically illustrated packet network links 106 using a connectionless (layer 2 or layer 3) networking protocol. However, it is known that connection-oriented networks (layer 0 and/or layer 1) generally support and facilitate connectionless networks.

Figure 2:
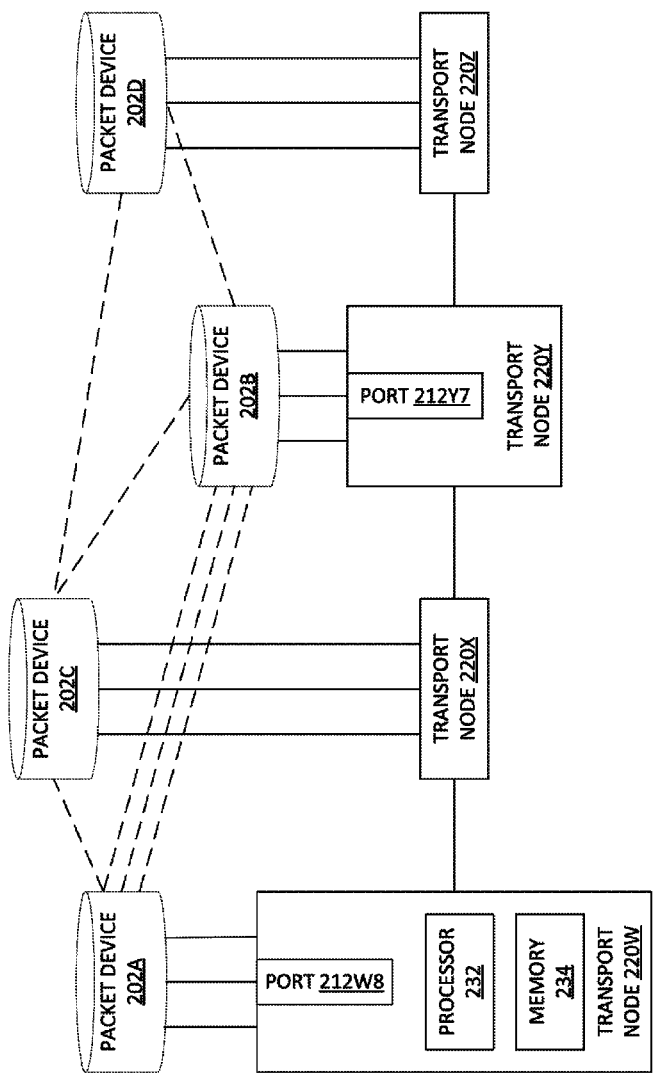
FIG. 2 schematically illustrates a network of packet devices with an underlying network of transport network nodes.

FIG. 2 schematically illustrates a network of packet devices with an underlying network of transport network nodes. The packet devices are associated, individually, with reference numbers 202A, 202B, 202C and 202D. The packet devices may, collectively or non-specifically, be referenced as 202. Associated with each packet device is a transport node 220. More specifically, a first transport node 220W is associated with the first packet device 220A, a second transport node 220Y is associated with the second packet device 220B, a third transport node 220X is associated with the third packet device 220C and a fourth transport node 220Z is associated with the fourth packet device 220D.

Transport nodes 220 are usually devices that can generate DWDM signals with OTN on top of it. Usually transport nodes 220 have a packet interface on one side, say 40G or 100G and the transport nodes 220 then aggregate those packet interfaces into multiple DWDM signals, which the transport nodes 220 then transmit on a smaller number of longer-reach fibers. An example of a suitable device for use as one of the transport nodes 220 is the OptiX OSN 9800, by Huawei Technologies Co. Ltd. Of Shenzhen, China. Transport nodes 220 may be seen to be different from routers, which typically have only packet interfaces and usually lack OTN or DWDM interfaces.

In the network illustrated in FIG. 2, the first transport node 220W is connected to the third transport node 220X. The third transport node 220X is connected to the second transport node 220Y. The second transport node 220Y is connected to the fourth transport node 220Z.

Example components of the first transport node 220W are illustrated, in FIG. 2, to include a processor 232, a memory 234 and a port 212W8. Of course, the second transport node 220Y also includes a processor, a memory and a port. Indeed, the second transport node 220Y is illustrated, in FIG. 2, as including a port 212Y7. Additionally, the third transport node 220X includes a processor, a memory and a port and the fourth transport node 220Z includes a processor, a memory and a port.

The mechanism by which the transport nodes 220 are connected to one another is outside the scope of the present application. However, a person of ordinary skill in the art would understand that the mechanism by which the transport nodes 220 are connected to one another could be selected from among Automatically Switched Optical Networks (ASON), Transport Software Defined Networking (TSDN), Generalized Multi-Protocol Label Switching (GMPLS), Wavelength Switched Optical Networks (WSON) and many others.

Consider that the first packet device 202A and the second packet device 202B already have packet network links 206 established therebetween. Furthermore, the packet network links 206 have been aggregated, such that the packet network links are LAG link members 206. To support the LAG link members 206 between the first packet device 202A and the second packet device 202B, physical ports of the first transport node 220W are connected to physical ports on the second transport node 220Y on an L0/L1 network.

Consider, further, that a network administrator wishes to create a new packet network link from a particular port at the first packet device 202A to a particular port at the second packet device 202B. As will be understood, a network administrator is usually a person. However, a network administrator may, for another example, be some high-level Application Programming Interface (API). To create the new packet network link, the network administrator may employ LACP. LACP makes use of names for the ports and the devices. For example, the first packet device 202A may be labeled as device "A" and the second packet device 202B may labeled as device "B." Furthermore, the particular port at the first packet device 202A may be labeled "A.1" and the particular port at the second packet device 202B may be labeled "B.3." A network administrator command to accomplish such a connection may read as "connect A.1 to B.3." The network administrator command to accomplish such a connection in the opposite direction may read as "connect B.3 to A.1." Conveniently, once the new packet network link has been created, the first packet device 202A and the second packet device 202B may exchange LACP messages to make the new link a LAG link member.

Traditionally, the network administrator creating the new packet network link from the first packet device 202A to the second packet device 202B would, in addition to issuing LACP control messages, issue instructions to cause a new transport network tunnel to be created in the transport network underlying the packet network, so that the new transport network tunnel could support the new packet network link.

In overview, rather than there being a requirement that specific instructions be issued to cause a transport network tunnel to be configured in the transport network, it is proposed herein to have a node in the transport network autonomously determine that a new transport network tunnel is to be configured and, responsively, cause the new transport network tunnel to be configured.

In general, a transport node (an L0/L1 device) adjacent to the packet device at the origin of LACP messages snoops on the LACP messages. The transport node may determine, based on the contents of a control LACP message, that a new packet network link is to be established between the origin packet device and a destination packet device. The contents of control LACP message may include, for example, an identification of the origin packet device, an identification of the destination packet device and an indication that a new packet network link is to be established. Responsive to the determining, the transport node adjacent to the origin packet device causes a transport network tunnel to be established between one of its ports and a port at a transport node adjacent the destination packet device. The transport node adjacent the origin packet device may then pass further LACP messages over the transport network tunnel to the transport node adjacent to the destination packet device. The transport node adjacent to the destination packet device may then pass the LACP messages to the destination packet device, thereby facilitating a new LAG member to be established between the origin packet device and the destination packet device.

Further snooping on the LACP messages may allow the transport node to determine when a transport network tunnel is to be reconfigured or removed. The transport node may, responsively, cause the reconfiguration or removal.

Figure 3:
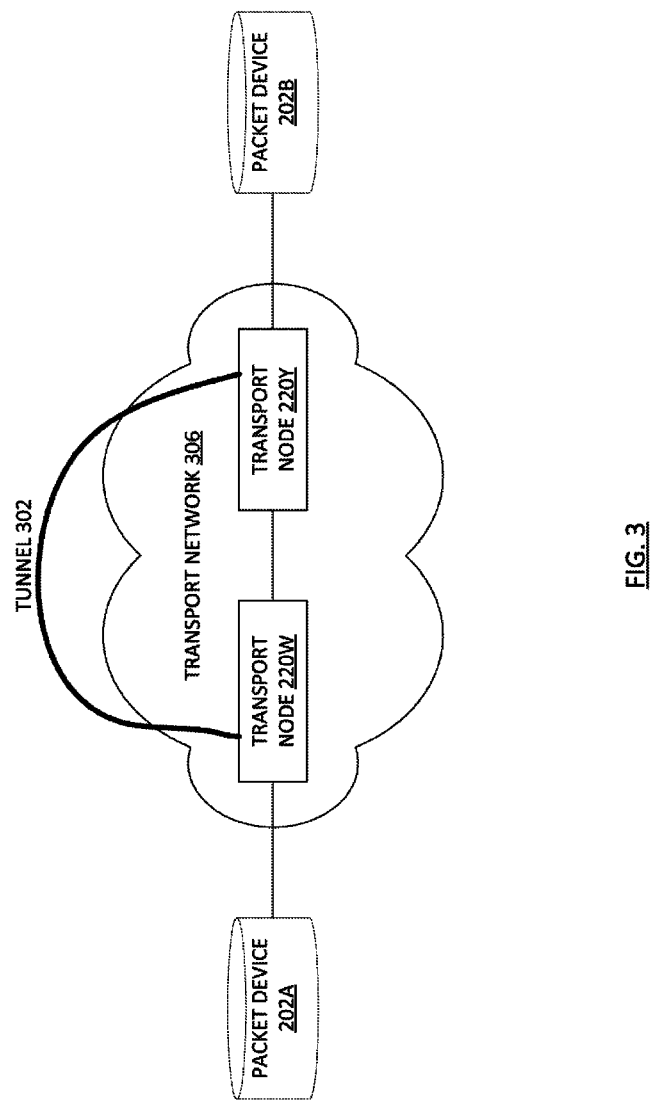
FIG. 3 illustrates aspects of the present application in a schematic manner.

FIG. 3 illustrates aspects of the present application in a schematic manner. The first transport node 220W and the second transport node 220Y are illustrated as being part of a transport network 306. The first packet device 202A and the second packet device 202B may communicate via a transport network tunnel 302.

Figure 4:
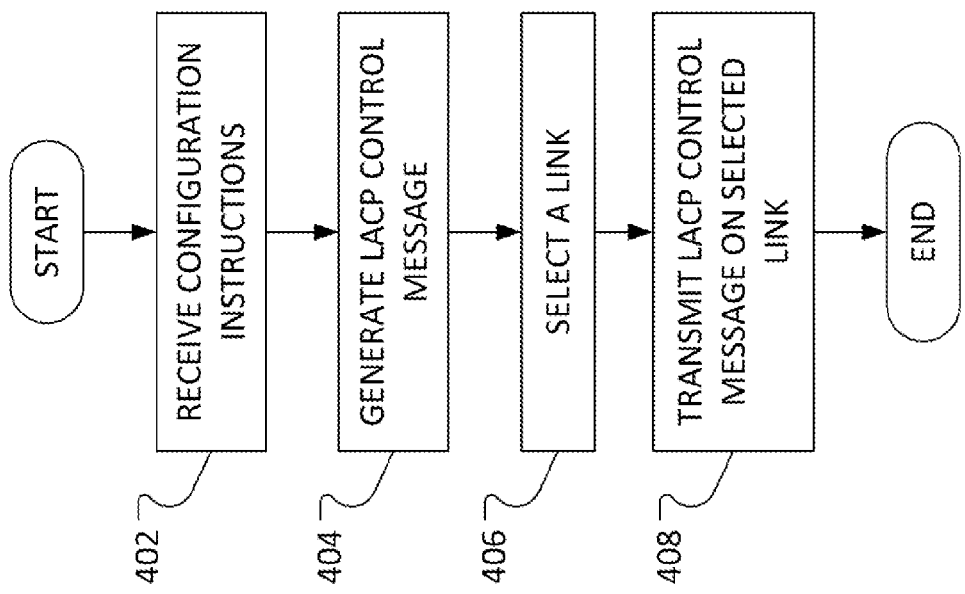
FIG. 4 illustrates example steps in a method of operation for one of the packet devices of FIG. 2.

FIG. 4 illustrates example steps in a method of operation for the first packet device 202A.

As is conventional, an administrator of the first packet device 202A may provide, to the first packet device 202A, configuration instructions. The configuration instructions may, for example, indicate that a new packet network link is to be formed between port 1 on the first packet device 202A and port 3 on the second packet device 202B. Responsive to receiving (step 402) the configuration instructions, the first packet device 202A may generate (step 404) an LACP control message to initiate the establishment of the new packet network link.

It may be that, as illustrated in FIG. 2, several packet network links already exists between the first packet device 202A and the second device 202B. These packet network links, of course, rely upon previously established transport network tunnels between the first transport node 220W and the second transport node 220Y. The first packet device 202A may then select (step 406) one of the pre-existing packet network links for transmission of the LACP control message to the second packet device 202B. The first packet device 202A may then transmit (step 408) the LACP control message to the second packet device 202B, using the selected packet network link.

Figure 5:
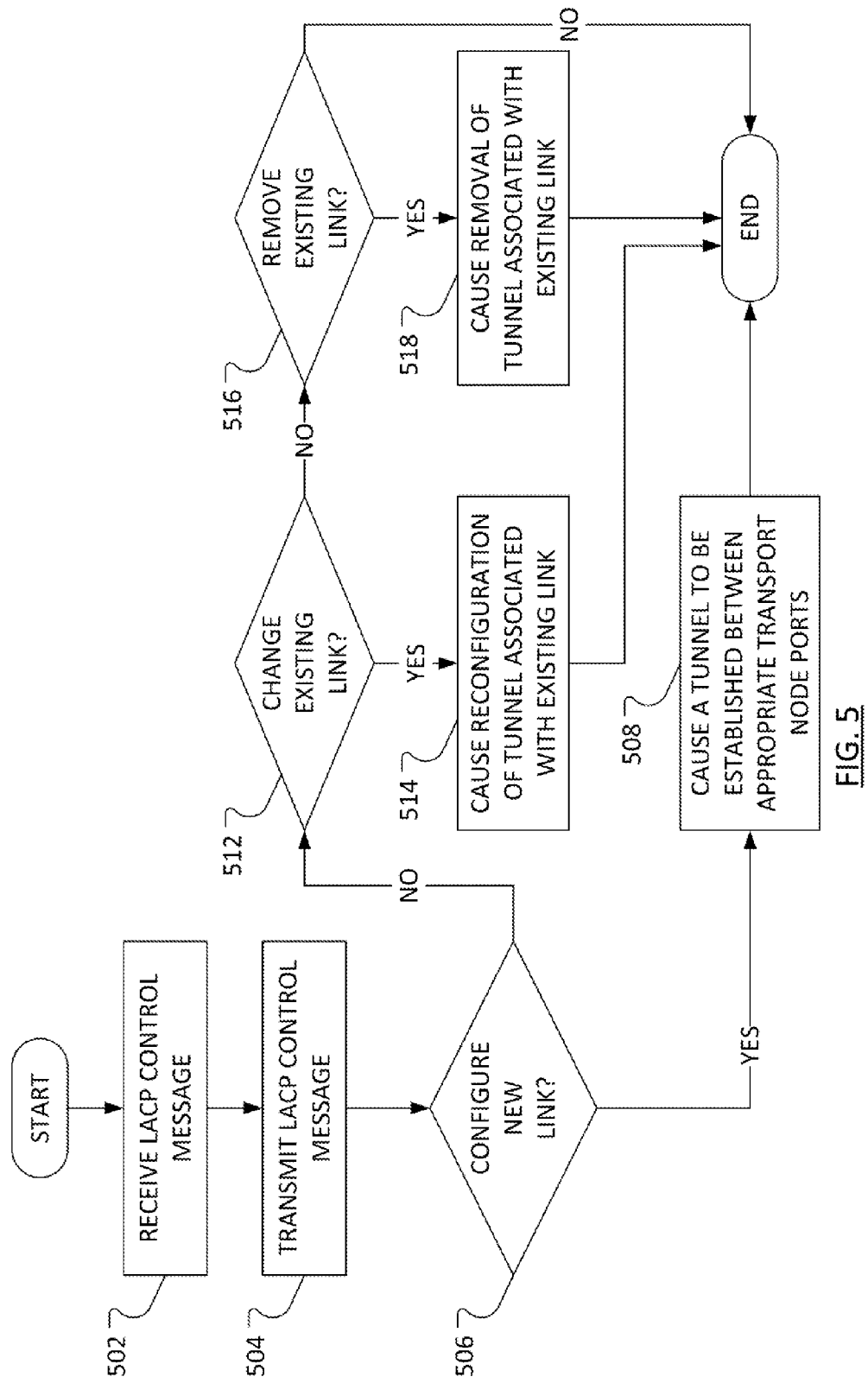
FIG. 5 illustrates example steps in a method of operation for the one of transport nodes of FIG. 2.

FIG. 5 illustrates example steps in a method of operation for the first transport node 220W.

The first transport node 220W includes the port 212W8 through which the first transport node 220W maintains bi-directional communication with the first packet device 202A. Furthermore, the second transport node 220Y includes the port 212Y7 through which the second transport node 220Y maintains bi-directional communication with the second packet device 202B.

It follows that the LACP control message, transmitted (step 406) by the first packet device 202A to the second packet device 202B, would be received (step 502) on the port 212W8 of the first transport device 220W. Responsive to receiving (step 502) the LACP control message, the first transport device 220W transmits (step 504) the LACP control message to the second transport device 220Y via a previously established transport network tunnel corresponding to the selected packet network link.

Also responsive to receiving (step 502) the LACP control message, the first transport device 220W snoops the LACP control message to determine (step 506), for example, whether the LACP control message relates to configuring a new packet network link. Upon determining (step 506) that the LACP control message relates to configuring a new packet network link, along with details for the new packet network link, the first transport device 220W may cause (step 508) the establishment of an L0/L1 transport network tunnel extending from the port 212W8 on the first transport node 220W to the port 212Y7 on the second transport node 220Y.

The precise manner of the causing (step 508) of the establishment of an L0/L1 transport network tunnel is dependent upon the nature of the transport network to which the first transport node 220W and the second transport node 220Y belong. The transport network may, for but four examples, operate according to the characteristics defined by Automatically Switched Optical Networks (ASON), Transport Software Defined Networking (TSDN), Generalized Multi-Protocol Label Switching (GMPLS) or Wavelength Switched Optical Networks (WSON). The precise manner of the causing (step 508) of the establishment of an L0/L1 transport network tunnel may, for example, involve configuration of one or more individual wavelengths and/or timeslots in the transport network. Indeed, causing (step 508) the establishment of an L0/L1 transport network tunnel may, for example, involve notifying an administrator to manually configure the transport network tunnel.

Upon determining (step 506) that the LACP control message does not relate to configuring a new packet network link, the first transport device 220W snoops the LACP control message to determine (step 512), for example, whether the LACP control message relates to changing the configuration of an existing packet network link.

Upon determining (step 512) that the LACP control message relates to changing the configuration of an existing packet network link, along with details of the change, the first transport device 220W may cause (step 514) the change to be implemented on the L0/L1 transport network tunnel extending from the port 212W8 on the first transport node 220W to the port 212Y7 on the second transport node 220Y.

As discussed hereinbefore in the context of causing the transport network tunnel to be established, the precise manner of the causing (step 514) the change to be implemented is dependent upon the nature of the transport network to which the first transport node 220W and the second transport node 220Y belong. Similarly, the causing (step 514) the change to be implemented may, for example, involve notifying an administrator to manually configure the transport network tunnel.

Upon determining (step 512) that the LACP control message does not relate to changing the configuration of an existing packet network link, the first transport device 220W snoops the LACP control message to determine (step 516), for example, whether the LACP control message relates to removal of an existing packet network link.

Upon determining (step 516) that the LACP control message relates to removal of an existing packet network link, the first transport device 220W may cause (step 518) the removal of the L0/L1 transport network tunnel extending from the port 212W8 on the first transport node 220W to the port 212Y7 on the second transport node 220Y.

As discussed hereinbefore in the context of causing the transport network tunnel to be established, the precise manner of the causing (step 518) the removal of the transport network tunnel is dependent upon the nature of the transport network to which the first transport node 220W and the second transport node 220Y belong. Similarly, the causing (step 518) the removal of the transport network tunnel may, for example, involve notifying an administrator to manually remove the transport network tunnel.

Additionally, the transport network tunnel may be removed based on other triggers. For example, given that the first transport node 220W is snooping LACP messages that are passing through the first transport node 220W, the first transport node 220W may monitor a frequency with which such LACP messages are passing through on their way through a particular transport network tunnel. For example, the first transport node 220W may maintain a value in an up-counting timer. The timer may be reset to zero each time the first transport node 220W notices, through snooping, that an LACP message is traversing the L0/L1 transport network tunnel extending from the port 212W8 on the first transport node 220W to the port 212Y7 on the second transport node 220Y. Upon determining that the counter has reached a threshold of, say, K seconds, the first transport node 220W may, autonomously, cause the removal of the transport network tunnel.

Figure 6:
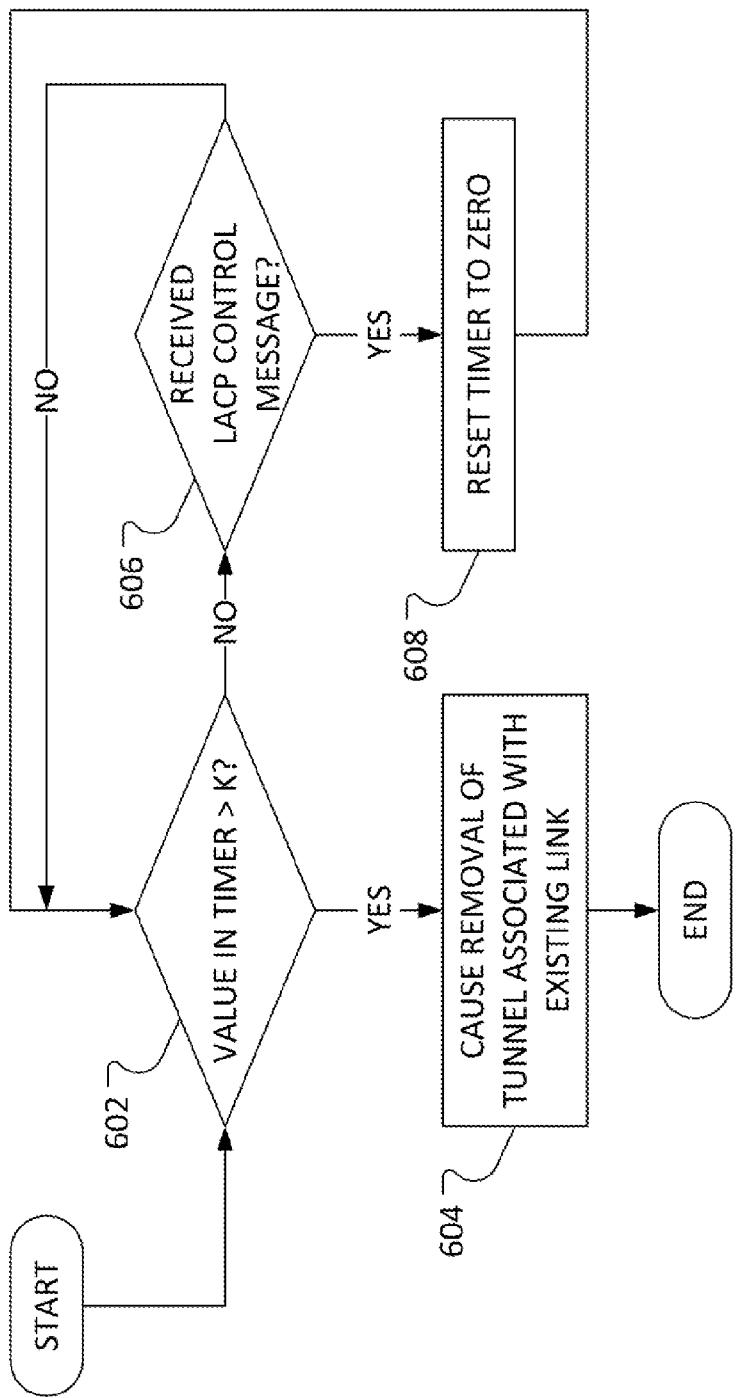
FIG. 6 illustrates example steps in a method of monitoring the passage of LACP control messages through one of transport nodes of FIG. 2.

FIG. 6 illustrates example steps in a method of monitoring the passage of LACP control messages. The first transport node 220W may determine (step 602) whether the value in the timer has surpassed a threshold, K. Upon determining (step 602) that the vale in the timer has surpassed K, the first transport node 220W may cause (step 604) the removal of the L0/L1 transport network tunnel extending from the port 212W8 on the first transport node 220W to the port 212Y7 on the second transport node 220Y.

Upon determining (step 602) that the value in the timer remains less than K seconds, the first transport node 220W may determine (step 606) whether an LACP control message has been received for passage on the L0/L1 transport network tunnel extending from the port 212W8 on the first transport node 220W to the port 212Y7 on the second transport node 220Y. Upon determining (step 606) that such an LACP control message has been received, the first transport node 220W may reset (step 608) the timer to zero and proceed to determine (step 602) whether the value in the timer remains less than K seconds.

Upon determining (step 606) that such an LACP control message has not been received, the first transport node 220W may merely proceed to determine (step 602) whether the value in the timer remains less than K seconds, without resetting the timer.

Notably, an up-counter timer is only one manner by which to determine that at least K seconds have elapsed since an LACP control message has been received for passage on a given transport network tunnel. Indeed, for another example, each time an LACP control message is received for passage on a given transport network tunnel, a down-counting timer may be reset to the threshold value. Rather than determine (step 602) whether the value in the up-counting timer remains less than K seconds, the first transport node 220W may determine whether the value in the up-counting timer remains greater than zero.

Conveniently, aspects of the present application create a level of interworking between packet devices 202 and the transport devices 220 without adding any new protocols.

The above-described implementations of the present application are intended to be examples only. Alterations, modifications and variations may be effected to the particular implementations by those skilled in the art without departing from the scope of the application, which is defined by the claims appended hereto.

What is claimed is:

1. A method of operating a first transport network node, the method comprising:
   receiving, on a first port connecting the first transport network node to a first packet forwarding device, a Link Aggregation Control Protocol (LACP) control message on a physical layer;
   determining, by snooping the LACP control message on the physical layer and in absence of higher layer signals, that the LACP control message relates to a packet network link between the first packet forwarding device and a second packet forwarding device, the second packet forwarding device being connected to a second port of a second transport network node; and
   responsive to the determining, causing configuration of a transport network tunnel from the first port at the first transport network node to the second port at the second transport network node.

2. The method of claim 1 wherein the LACP control message relates to establishing the packet network link.

3. The method of claim 2 wherein the causing configuration comprises causing creation of the tunnel.

4. The method of claim 1 wherein the LACP control message relates to reconfiguring the packet network link.

5. The method of claim 4 wherein the causing configuration comprises causing implementation of changes to the tunnel.

6. The method of claim 1 wherein the LACP control message relates to removing the packet network link.

7. The method of claim 6 wherein the causing configuration comprises causing the tunnel to be removed.

8. The method of claim 1 further comprising:
   determining that a time since a last LACP control message has been received for passage on a given transport network tunnel has exceeded a threshold; and
   responsive to the determining, causing the given transport network tunnel to be removed.

9. A network comprising:
   a first transport network node having a first port;
   a second transport network node having a second port;
   a first packet forwarding device connected to the first port;
   a second packet forwarding device connected to the second port;
   the first transport network node adapted to:
      receive, on the first port, a Link Aggregation Control Protocol (LACP) control message on a physical layer;
      determine, by snooping the LACP control message on the physical layer and in absence of higher layer signals, that the LACP control message relates to a packet network link between the first packet forwarding device and the second packet forwarding device; and
      cause configuration of a tunnel from the first port to the second port.

10. The network of claim 9 wherein the LACP control message relates to establishing the packet network link and wherein the first transport network node is adapted to cause the configuration by causing creation of the tunnel.

11. The network of claim 9 wherein the LACP control message relates to reconfiguring the packet network link and wherein the first transport network node is adapted to cause the configuration by causing implementation of changes to the tunnel.

12. The network of claim 9 wherein the LACP control message relates to removing the packet network link and wherein the first transport network node is adapted to cause the configuration by causing the tunnel to be removed.

13. The network of claim 9 wherein the processor is further adapted to:
   determine that a time since a last LACP control message has been received for passage on a given transport network tunnel has exceeded a threshold; and
   responsive to the determining, cause the given transport network tunnel to be removed.

14. A computer readable medium storing instructions that, when executed by a processor in a transport network node having a first port connected to a first packet forwarding device, cause the processor to:
   receive, on the first port, a Link Aggregation Control Protocol (LACP) control message on a physical layer;
   determine, by snooping the LACP control message on the physical layer and in absence of higher layer signals, that the LACP control message relates to a packet network link between a first packet forwarding device and a second packet forwarding device, the second packet forwarding device being connected to a second port of a second transport network node; and
   cause configuration of a tunnel from the first port to the second port.

15. The computer readable medium of claim 14 storing instructions that further cause the processor to:
   determine that a time since a last LACP control message has been received for passage on a given transport network tunnel has exceeded a threshold; and
   cause the given transport network tunnel to be removed.

* * * * *